(12) United States Patent
Hsieh et al.

(10) Patent No.: US 7,812,818 B2
(45) Date of Patent: Oct. 12, 2010

(54) INERTIAL SENSING METHOD AND SYSTEM

(75) Inventors: Chin-Lin Hsieh, Taipei County (TW);
Shun-Nan Liou, Kaohsiung (TW);
Ming-Jye Tsai, Hsinchu County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 912 days.

(21) Appl. No.: 11/671,093

(22) Filed: Feb. 5, 2007

(65) Prior Publication Data

US 2008/0143675 A1 Jun. 19, 2008

(30) Foreign Application Priority Data

Dec. 13, 2006 (TW) .............................. 95146597 A

(51) Int. Cl.
*G09G 5/08* (2006.01)
(52) U.S. Cl. ...................................... 345/157
(58) Field of Classification Search ............... 345/157, 345/158, 159, 163; 340/669
See application file for complete search history.

(56) References Cited

U.S. PATENT DOCUMENTS

| | | | |
|---|---|---|---|
| 5,874,941 A | 2/1999 | Yamada | |
| 6,933,923 B2 * | 8/2005 | Feinstein | 345/158 |
| 7,158,118 B2 * | 1/2007 | Liberty | 345/158 |
| 7,424,388 B2 * | 9/2008 | Sato | 702/152 |
| 2006/0250358 A1 * | 11/2006 | Wroblewski | 345/157 |

FOREIGN PATENT DOCUMENTS

| | | |
|---|---|---|
| CN | 1598751 | 3/2005 |
| TW | 090221010 | 4/2003 |

* cited by examiner

*Primary Examiner*—Richard Hjerpe
*Assistant Examiner*—Tom V Sheng
(74) *Attorney, Agent, or Firm*—WPAT, PC; Justin King

(57) ABSTRACT

An inertial sensing method is disclosed, which is capable of detecting tilting of an inertial sensing apparatus with respect to a specific level surface while using the detection for defining/controlling movements of a cursor displayed on a display, In a preferred aspect, as it is capable of acting as an hand-held input device, a swing of a hand holding the inertial sensing apparatus can be detected thereby and is used for controlling a page change of a display. Operationally, a micro inertial sensing module of the aforesaid inertial sensing apparatus detects changes of gravity caused by tilts of the inertial sensing apparatus and then generates inclination signals accordingly while enabling a wireless transmitter to send the same to a micro processing unit where the inclination signals are filtered and then compared with predefined datum signals so as to enable a cursor control circuit to define/control movements of a cursor displayed on a display according to the comparison. In addition, an effect of vibration measured along an axis of a Cartesian coordinate system of X-, Y-, and Z-axes defining the inertial sensing apparatus can be eliminated by the use of variations of signals measured along other axes of the Cartesian coordinate system. Preferably, by using two Y-axis accelerometers of the micro inertial sensing module to measure a difference of centrifugal forces detected respectively thereby, the adverse affection of centrifugal forces exerting upon the Y-axis can be eliminated.

30 Claims, 7 Drawing Sheets

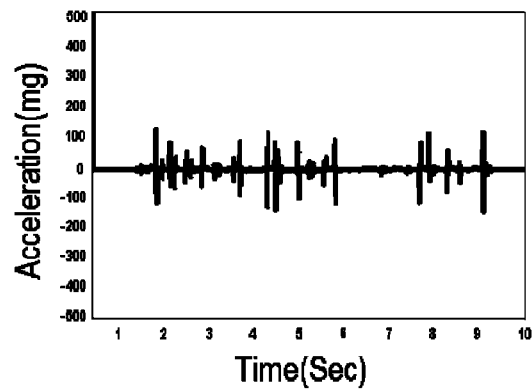
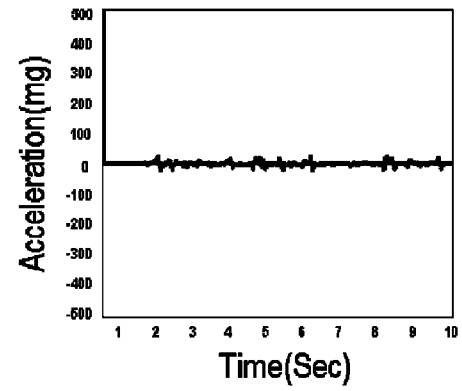
FIG. 6(a)　　　　　　　FIG. 6(b)
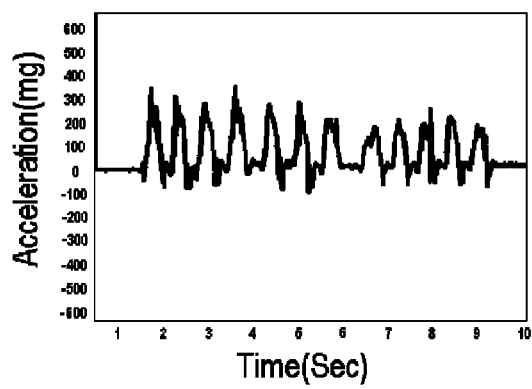
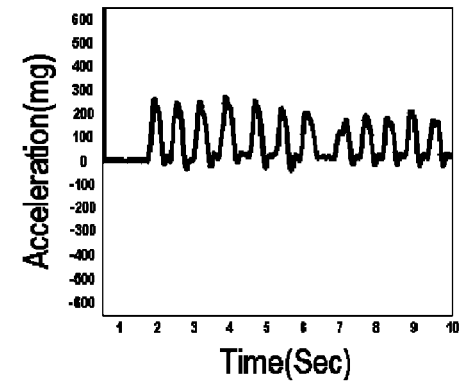
FIG. 7(a)　　　　　　　FIG. 7(b)

FIG. 11
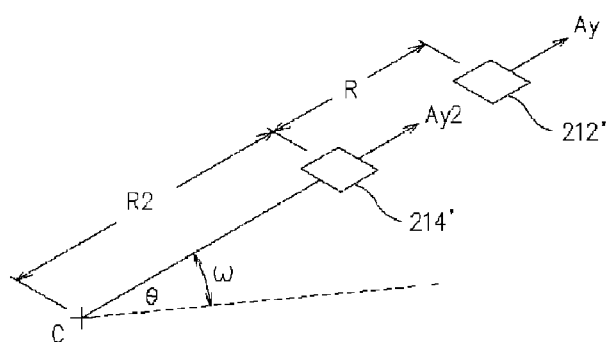
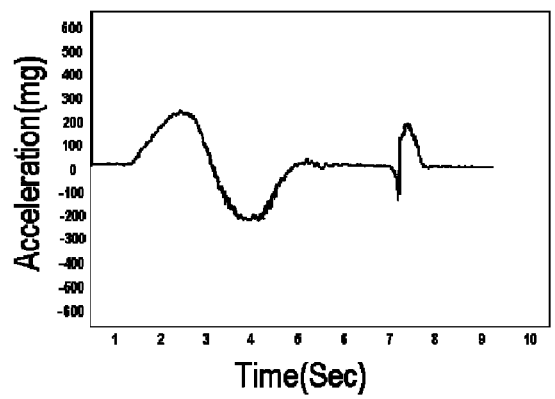
FIG. 12(a)
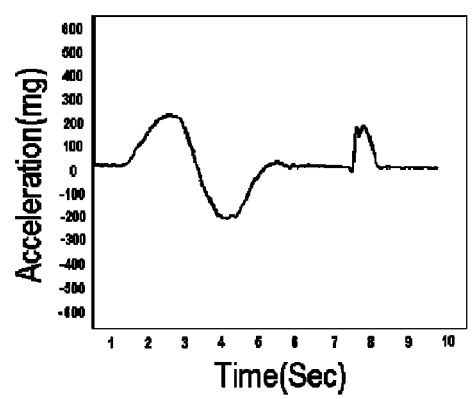
FIG. 12(b)
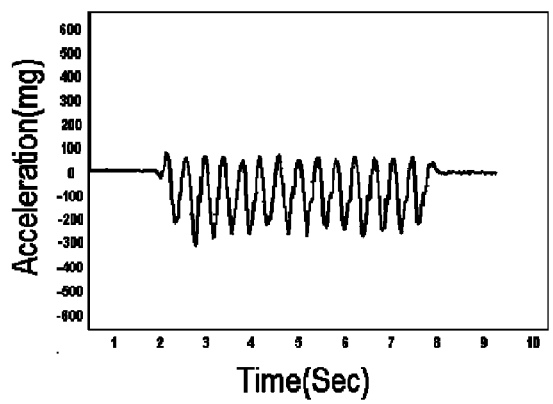
FIG. 13(a)
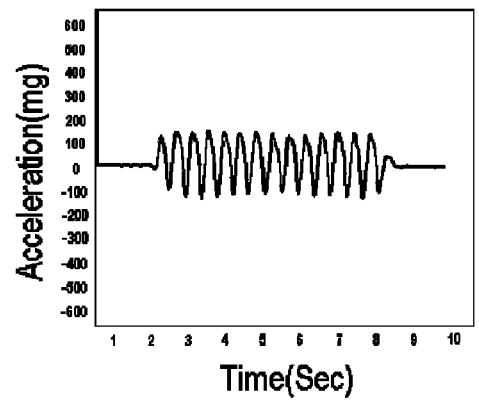
FIG. 13(b)

INERTIAL SENSING METHOD AND SYSTEM

FIELD OF THE INVENTION

The present invention relates to an inertial sensing method and apparatus, and more particularly, to a three-dimensional inertial sensing apparatus, capable of detecting tilting of a built-in micro inertial sensing module with respect to a specific level surface while using the detection for accurately defining/controlling movements of a cursor displayed on a display, In a preferred aspect, as it is capable of acting as an hand-held input device, a swing of a hand holding the three-dimensional inertial sensing apparatus can be detected thereby and is used for controlling a page change displayed on a display, that not only it meets the ergonomic requirement for a handheld device, but also it can be used for controlling a continuous page-changing by a specific movement of the hand holding the three-dimensional inertial sensing apparatus, and thus it is suitable to used as cursor control device.

BACKGROUND OF THE INVENTION

Currently, there are many kinds of computer mouse available on the market, which are the most popular human-machine interface used by computers as cursor-control device. There are three basic types of mice, which are mechanical mouse, LED optical mouse and laser mouse with respect to the different means of detection. However, since the aforesaid mice are constrained to use on a working surface that the condition of the working surface will have great influence upon the detection of the aforesaid mice as it will affect the ball rolling of the mechanical mouse and the shadow generating of the two optical mice, they can no longer meet the requirements of today's video games and multimedia applications, which desire to have an cursor-control device capable operated on a planar surface and in the air. As for the presentation device, it is usually a remote control device capable of enabling a lecturer to cycle through transparencies as it is designed with press-keys and relating circuits for controlling operations such as turning on/off, scrolling up/down and page forwarding/backwarding, etc. Nevertheless, as more and more people like to give his/her presentation by the use of his/her personal computer, it is more and more common to have to connect a presentation device to a computer while preparing a presentation, causing the presentation device and usually a computer mouse to coexist in a same space at the same time that the wiring of the two devices can be messy and troublesome.

There are already several cursor-control devices integrating functions of the computer mouse and the presentation device. However, the control methods adopted thereby are still similar to those conventional computer mice and thus suffering the same limitations. As for the inertial/gravity mouse which are being aggressively studied recently, it use accelerometers for detecting acceleration of a movement while processing the detection to be used for controlling an object displayed on a computer monitor or other interactive devices, but it is still troubled by many technical difficulties and thus remains to be improved.

There are many researches relating to inertial mouse. One of which is an inertial mouse disclosed in U.S. Pat. No. 5,874,941, entitled "Presentation Supporting Device", as seen in FIG. 1. The presentation supporting device 2 shown in FIG. 1 is comprised of an X-axis accelerometer 1A, a Y-axis accelerometer 1B and a pair of signal processors 10A and 10B, by which acceleration variations caused by the inclination of the presentation supporting device 2 are detected by the two accelerometers 1A and 1B, causing the two to generate acceleration signals accordingly, and the two signal processors 10A and 10B process the acceleration signals to output cursor moving control signals for controlling movement of a cursor on a computer display screen. Operationally, when the inclination of the presentation supporting device 2 reaches a specific angle, the cursor controlled thereby is activated to move accordingly, and as soon as the cursor is moved to a desired position of the computer display screen, the movement of the cursor is stopped by returning the presentation supporting device 2 back to its initial position. However, as the presentation supporting device 2 is subjecting to the influence of gravity, it is often occurred that the cursor will continue to move even when the presentation supporting device 2 has already returned to its initial position. Thus, the presentation supporting device 2 fails to position the cursor accurately exactly when the supporting device 2 returns to its initial position and thus has unsatisfactory stability. It will take a user a great effort and time just to position the cursor accurately at his/her preferred position. Moreover, it is noted that the larger the inclination of the presentation supporting device 2 is, the larger the resulting accelerations will be, and thus the fast the cursor controlled thereby will be moving on the computer display screen so that the presentation supporting device 2 is difficult to control. In addition, the aforesaid presentation supporting device 2 does not equip with continuous page changing ability Please refer to FIG. 2, which is a gravity mouse disclosed in TW Pat. Appl. No. 90221010. As the gravity mouse is being held to move and used for controlling the movement of a cursor displayed on a monitor of a personal computer (PC), its gravity sensor (i.e. G sensor) with potential energy measuring ability is enable to detect the potential energy variation of the gravity mouse caused by a movement of the same while transmitting a signal generated accordingly to its micro process unit (MCU) to be processed. As the MCU is able to detect the duration of the movement while receiving an acceleration signal caused by the movement, it can generate a control signal for controlling the cursor to move accordingly with respect to the duration and the acceleration. It is known that the movements of the cursor is determined by an integration operation performed based upon the detections of at least two accelerometers configuring in the gravity mouse at two perpendicular axes. Thus, as the movement is defined by integration which is prone to accumulate error, the positioning of the cursor might not be accurate. Moreover, the aforesaid gravity mouse does not equip with continuous page changing ability.

Therefore, it is in need of an inertial sensing input apparatus and method that not only is free from the shortcoming of prior arts, but also is equipped with continuous page changing ability.

SUMMARY OF THE INVENTION

In view of the disadvantages of prior art, the primary object of the present invention is to provide a three-dimensional inertial sensing method and apparatus, capable of accurately defining and controlling movements of a cursor displayed on a display, that is ease to operate.

It is another object of the invention to provide a three-dimensional inertial sensing apparatus, capable of being used as an ergonomic hand-held input device that a swing of a hand holding the three-dimensional inertial sensing apparatus can be detected thereby and is used for controlling a page change of a display, i.e. especially capable of controlling a continuous page-changing by a specific movement of the hand holding the three-dimensional inertial sensing apparatus.

Yet, another object of the invention is to provide a three-dimensional inertial sensing method apparatus, by which an vibration measured along an axis of a Cartesian coordinate system of X-, Y-, and Z-axes defining the inertial sensing apparatus can be eliminated by the use of variations of signals measured along other axes of the Cartesian coordinate system.

Further, another object of the invention is to provide a three-dimensional inertial sensing method and apparatus, capable of using the difference between the two centrifugal forces detected respectively by two Y-axis accelerometers, coaxially arranged on a Y axis of a Cartesian coordinate system of X-, Y-, and Z-axes defining the inertial sensing apparatus, to eliminate the influence of centrifugal force working upon the inertial sensing apparatus.

In accordance with one aspect of the present invention, there is provided a three-dimensional inertial sensing method, comprising the steps of: using a micro inertial sensing module to detect an acceleration of gravity for generating a raw inclination signal accordingly; low-filtering the raw inclination signal for obtaining a stabilized inclination signal; and detecting whether the micro inertial sensing module is situated in a cursor-control mode or a page-changing mode so as to correspondingly select a process to be perform from the group consisting a cursor-control process and a page-change process.

Preferably, the cursor-control process comprises the steps of: registering an initial signal of the micro inertial sensing module; calculating a signal variation amount basing on the raw inclination signal, the stabilized inclination signal so as to compensate the raw inclination signal using the signal variation amount; calculating the difference between the compensated inclination signal and the initial signal; and mapping the differences as a coordinate signal for controlling the movement of a cursor displayed on a display.

In a preferred aspect, the micro inertial sensing module is comprised of: an X-axis accelerometer, for measuring acceleration variations of gravity caused by a rolling movement of the micro inertial sensing module with respect to an X axis of a Cartesian coordinate system of X-, Y-, and Z-axes defining the micro inertial sensing module; and a Y-axis accelerometer, for measuring acceleration variations of gravity caused by a pitch movement of the micro inertial sensing module with respect to a Y axis of the Cartesian coordinate system.

Preferably, the calculating of the signal variation amount basing on the raw inclination signal, the stabilized inclination signal for compensating the raw inclination signal using the signal variation amount further comprises the steps of: modifying the raw inclination signal detected by the X-axis accelerometer by subtracting an X-axis vibration signal detected by the X-axis accelerometer from the raw inclination signal detected by the X-axis accelerometer; modifying the raw inclination signal detected by the Y-axis accelerometer by subtracting an Y-axis vibration signal detected by the Y-axis accelerometer from the raw inclination signal detected by the Y-axis accelerometer; registering an X-axis variation as the subtraction of the initial signal detected by the X-axis accelerometer from the modified X-axis raw inclination signal; and registering a Y-axis variation as the subtraction of the initial signal detected by the Y-axis accelerometer from the modified Y-axis raw inclination signal.

Preferably, the micro inertial sensing module further comprises a Z-axis accelerometer, used for detecting an acceleration of gravity with respect to the Z-axis of the Cartesian coordinate system, caused by the rolling and pitching of the micro inertial sensing module detected respectively by the X-axis accelerometer and Y-axis accelerometer, so as to obtain information relating to the positioning of the micro inertial sensing module.

Preferably, the micro inertial sensing module further comprises a second Y-axis accelerometer, spaced from the Y-axis accelerometer by a specific distance.

Preferably, the influence of centrifugal force working on the inertial sensing apparatus can be eliminated by the use of the difference between two centrifugal forces detected respectively by the two Y-axis accelerometers in terms of the following formula:

$$Ay=(R+R2)/R \times (Tvy-Tvy2);$$

$$\text{Modified} Tvy=Tvy-Ay$$

wherein Ay is the centrifugal force detected by the Y-axis accelerometer;
R is the distance spaced between the Y-axis and the second Y-axis accelerometer;
R2 is the distance between the second Y-axis accelerometer and a center of rotation;
Tvy is the inclination signal of the Y-axis accelerometer;
Tvy2 is the inclination signal of the second Y-axis accelerometer;

That is, a modified Y-axis inclination signal can be obtained by subtracting the centrifugal force Ay from the raw Y-axis inclination signal Tvy.

Preferably, the process of eliminating the influence of centrifugal force is performed ahead of the process of compensating the raw inclination signal using the signal variation amount.

Preferably, the page-change process comprises the steps of:
detecting whether the inclination of the micro inertial sensing module with respect to the X-axis and Y-axis is falling within a range of balance; if so, continue the detecting; otherwise, steps posterior to the detection is perform; otherwise, the process flow back to the foregoing mode detecting step;
evaluating whether an instant variation of the raw X-axis inclination signal is exceeding a threshold range; if so, a page-changing is enabled; otherwise, the process flow back to the foregoing mode detecting step.

Preferably, the range of balance is defined as 0 g±0.3 g, wherein g=9.8 $^m/s^2$.

Preferably, a continuous page-changing is perform while the instant variation of the raw inclination signal is exceeding a threshold range and the raw inclination signal is not transient but lastingly fixed to a detection of the micro inertial sensing module as it is tilt by a specific inclination angle.

Preferably, the continuous page-changing is stopped and the process proceeds back to the mode detecting step as soon as the raw inclination signal is not lastingly fixed to a detection of the micro inertial sensing module as it is tilt by a specific inclination angle.

In a preferred aspect, the micro inertial sensing module is comprised of: an X-axis accelerometer, for measuring acceleration variations of gravity caused by a rolling movement of the micro inertial sensing module with respect to an X axis of a Cartesian coordinate system of X-, Y-, and Z-axes defining the micro inertial sensing module; and a Y-axis accelerometer, for measuring acceleration variations of gravity caused by a pitch movement of the micro inertial sensing module with respect to a Y axis of the Cartesian coordinate system.

Preferably, the micro inertial sensing module is coupled to a central processing unit, capable of receiving the measurements of acceleration variations and thus generating raw inclination signals accordingly.

Preferably, the central processing unit is connected to a wireless transmitter for transmitting the raw inclination signals.

Preferably, the wireless transmitter is enabled to function corresponding to a wireless receiver in a manner that the wireless receiver is able to receive the raw inclination signals transmitted by the wireless transmitter and thus send the received raw inclination signals to a micro processing unit to be low-pass filtered and processed by other posterior procedures.

Preferably, the micro processing unit is connected to a display by way of a cursor control circuit, capable of controlling the movement of a cursor displayed on the display as well as controlling a page-changing or continuous page-changing on the display.

Preferably, the micro inertial sensing module is connected to a control key, capable of being activated automatically or manually for switch the micro inertial sensing module between the cursor-control mode and the page-changing mode.

In accordance with another aspect of the present invention, there is provided a three-dimensional inertial sensing apparatus, comprising:
  a micro inertial sensing module, for detecting an acceleration of gravity for generating a raw inclination signal accordingly, further comprising:
    an X-axis accelerometer, for measuring acceleration variations of gravity caused by a rolling movement of the micro inertial sensing module with respect to an X axis of a Cartesian coordinate system of X-, Y-, and Z-axes defining the micro inertial sensing module;
    a first Y-axis accelerometer, for measuring a first acceleration variation of gravity caused by a pitch movement of the micro inertial sensing module with respect to a Y axis of the Cartesian coordinate system; and
    a second Y-axis accelerometer, for measuring a second acceleration variation of gravity caused by a pitch movement of the micro inertial sensing module with respect to a Y axis of the Cartesian coordinate system;
  and
  a receiving end, for receiving the raw inclination signal of the micro inertial sensing module.

Preferably, the micro inertial sensing module further comprises: a Z-axis accelerometer, used for detecting an acceleration of gravity with respect to the Z-axis of the Cartesian coordinate system, caused by the rolling and pitching of the micro inertial sensing module detected respectively by the X-axis accelerometer and Y-axis accelerometer, so as to obtain information relating to the positioning of the micro inertial sensing module.

Preferably, the first and the second Y-axis accelerometers are spaced from each other by a specific distance.

Preferably, the micro inertial sensing module is coupled to a central processing unit, capable of receiving the measurements of acceleration variations and thus generating raw inclination signals accordingly.

Preferably, the central processing unit is connected to a wireless transmitter for transmitting the raw inclination signals.

Preferably, the wireless transmitter is enabled to function corresponding to a wireless receiver in a manner that the wireless receiver is able to receive the raw inclination signals transmitted by the wireless transmitter and thus send the received raw inclination signals to a micro processing unit to be low-pass filtered and processed by other posterior procedures.

Preferably, the micro processing unit is connected to a display by way of a cursor control circuit, capable of controlling the movement of a cursor displayed on the display as well as controlling a page-changing or continuous page-changing on the display.

Preferably, the micro inertial sensing module is connected to a control key, capable of being activated automatically or manually for switch the micro inertial sensing module between the cursor-control mode and the page-changing mode.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 6(a) shows accelerations detected by the X-axis accelerometer without vibration modification.

FIG. 6(b) shows accelerations detected by the X-axis accelerometer with vibration modification.

FIG. 7(a) shows accelerations detected by the Y-axis accelerometer without vibration modification.

FIG. 7(b) shows accelerations detected by the Y-axis accelerometer with vibration modification.

FIG. 11 shows the relative positioning of a Y-axis accelerometer, a second Y-axis accelerometer according to the present invention.

FIG. 12(a) is a profile showing the detection of the Y-axis accelerometer as the Y-axis accelerometer is being influenced by centrifugal forces.

FIG. 12(b) is a profile showing the modified detection of the Y-axis accelerometer as the influence of centrifugal forces is eliminated.

FIG. 13(a) shows accelerations detected by the Y-axis accelerometer without centrifugal force modification as the Y-axis accelerometer is moving circularly.

FIG. 13(b) shows modified accelerations detected by the Y-axis accelerometer with centrifugal force modification as the Y-axis accelerometer moving circularly.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
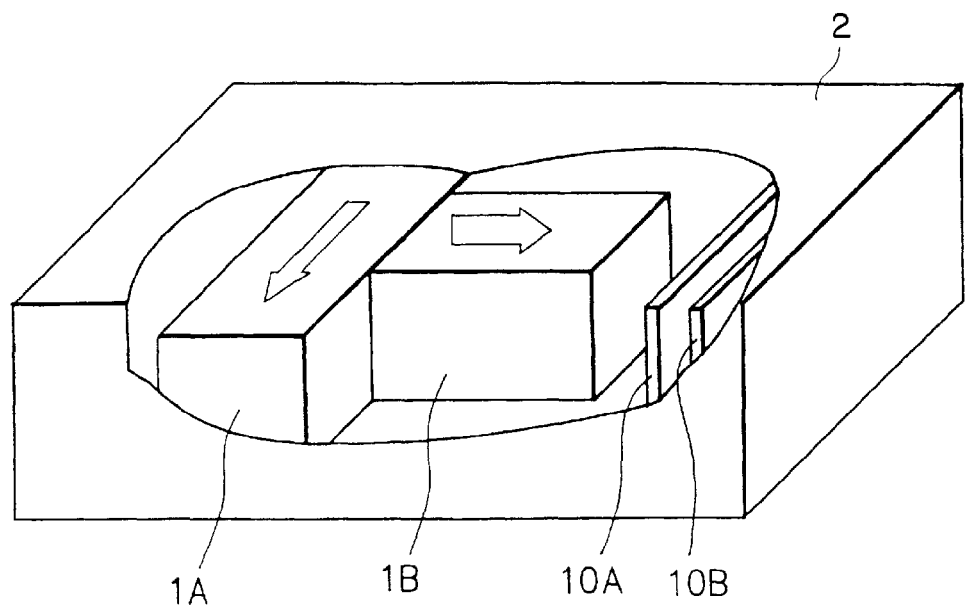
FIG. 1 shows a presentation supporting device disclosed in U.S. Pat. No. 5,874,941.
Figure 2:
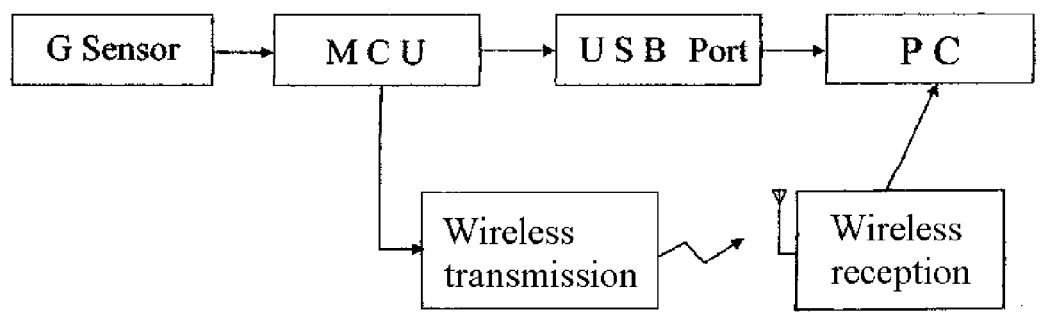
FIG. 2 is a gravity mouse disclosed in TW Pat. Appl. No. 90221010.
Figure 3:
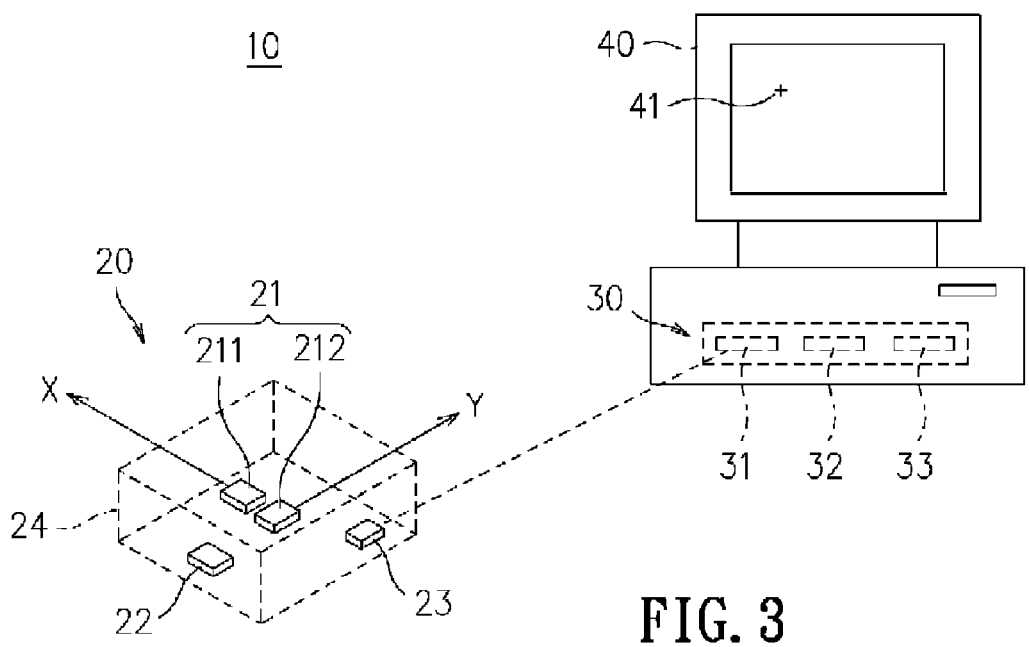
FIG. 3 is a schematic diagram illustrating an inertial sensing apparatus according to a first preferred embodiment of the invention.
Figure 4:
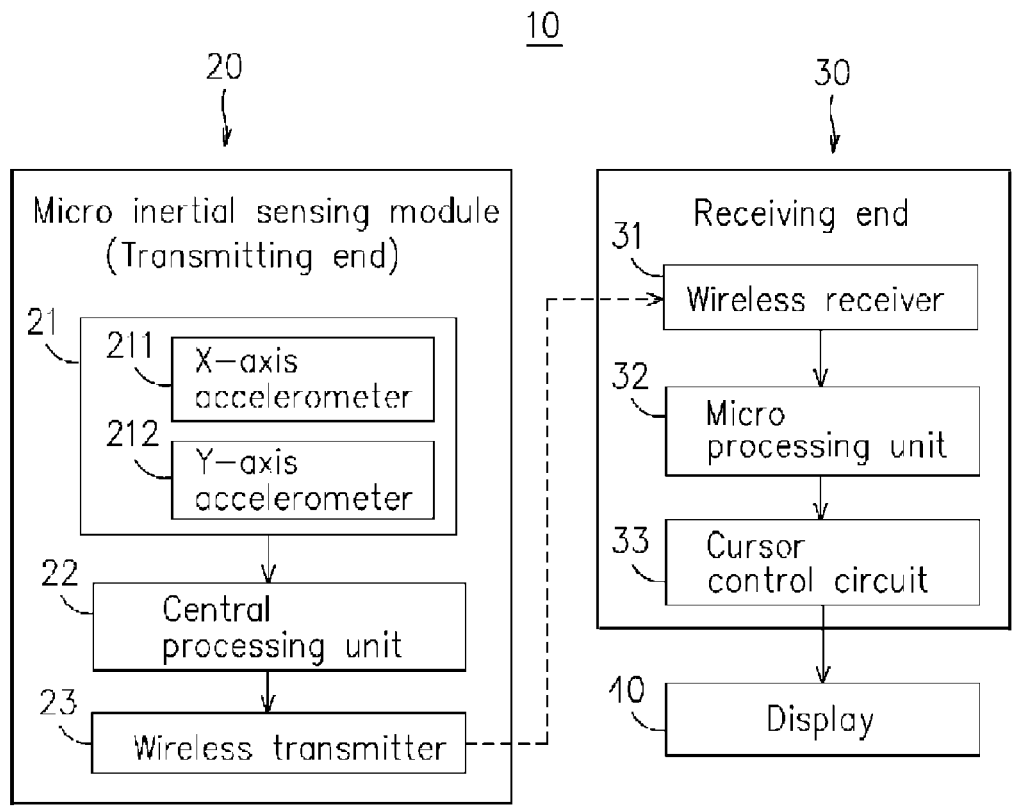
FIG. 4 is a function block diagram of FIG. 3.

Please refer to FIG. 3 and FIG. 4, which are respectively a schematic diagram illustrating an inertial sensing apparatus according to a first preferred embodiment of the invention and a function block diagram thereof. As seen in the figures, the three-dimensional inertial sensing apparatus 10 is primarily comprised of: a transmitting end, being substantially a micro inertial sensing module 20; and a receiving end 30. In a preferred aspect, the micro inertial sensing module 20 is further comprised of: an micro inertial sensor 21, having an X-axis accelerometer 211 for measuring acceleration variations of gravity caused by a rolling movement of the micro inertial sensing module 20 with respect to an X axis of a Cartesian coordinate system of X-, Y-, and Z-axes defining the micro inertial sensing module 20, and a Y-axis accelerometer 212 for measuring acceleration variations of gravity caused by a pitch movement of the micro inertial sensing module 20 with respect to a Y axis of the Cartesian coordinate system; a central processing unit 22, for receiving and processing signals from the micro inertial sensor 21 so as to generate a raw inclination signal accordingly; and a wireless transmitter 23, for transmitting the inclination signal received from the central processing unit 22. Moreover, the micro inertial sensor 21, the central processing unit 22 and the wireless transmitter 23 are all being received in a housing 24 while all being electrically networked to each other by a circuit which is further electrically connected to a control button disposed outside the housing 24. By disposing the control button outside the housing 24, a user holding the three-dimensional inertial sensing apparatus 10 is capable of initiating a signal transmission automatically or manually simply by the pressing of the control button.

Moreover, the receiving end 30, being substantially a computer or a multimedia device, is comprised of a wireless receiver 31, a micro processing unit 32 and cursor control circuit 33 connected to a display 40. In which, the wireless receiver 31 is enabled to function corresponding to the wireless transmitter 23 in a manner that the wireless receiver 31 is able to receive the raw inclination signals transmitted by the wireless transmitter 23 and thus send the received raw inclination signals to the micro processing unit 32 to be low-pass filtered and processed by other posterior procedures, and then the micro processing unit 32 send the processing result to the cursor control circuit 33 which is then going to control the movement of a cursor 41 displayed on the display 40 as well as controlling a page-changing or continuous page-changing on the display 40, basing on the processing result.

Figure 5:
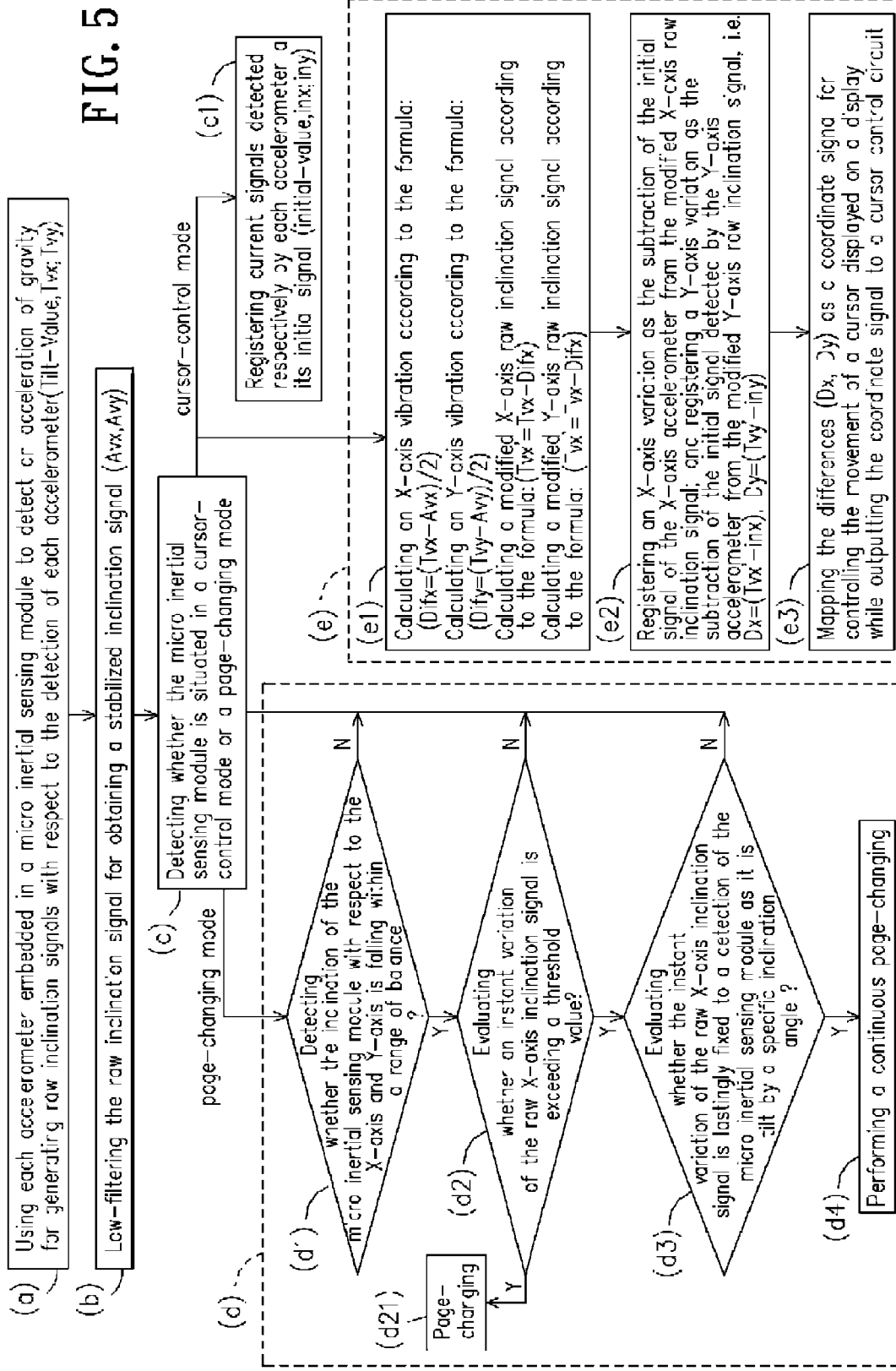
FIG. 5 is a flow chart depicting operation steps of the inertial sensing apparatus of the first preferred embodiment of the invention.

Please refer to FIG. 5, which is a flow chart depicting operation steps of the inertial sensing apparatus of the first preferred embodiment of the invention. The flow of the operation steps of the inertial sensing apparatus is illustrated in FIG. 5 and the detailed description of each step is depicted in the following:

(a) using each accelerometer embedded in the micro inertial sensing module 20 to detect an acceleration of gravity for generating raw inclination signals (Tilt-Value) with respect to the detection of each accelerometer; i.e. using the X-axis accelerometer 211 and the Y-axis accelerometer 212 to detect rolling and pitching of the micro inertial sensing module 20 while sending the detection to the central processing unit 22 to be processed and thus generating an X-axis raw inclination signal Tvx and a Y-axis raw inclination signal Tvy to be received by the receiving end 30 by the transmitting of the wireless transmitter 23, where the wireless receiver 31 receives and send the received signals to the micro processing unit 32.

(b) low-filtering the X-axis raw inclination signal Tvx and the Y-axis raw inclination signal Tvy for obtaining two stabilized inclination signals Avx and Avy.

(c) detecting whether the micro inertial sensing module 20 is situated in a cursor-control mode e or a page-changing mode d, since the two stabilized inclination signals Avx and Avy is to be processed basing on the operating mode of the micro inertial sensing module; that is, a control key, which can be a press button or a control switch and is arranged on the housing as seen in FIG. 3, is used for switch the micro inertial sensing module 20 between the cursor-control mode e and the page-changing mode d in a manner that the micro inertial sensing module 20 is being situated in the cursor-control mode e when the control button is being activated; otherwise the micro inertial sensing module 20 is being situated in the page-changing mode d.

(c1) registering current signals detected respectively by each accelerometer a its initial signal (initial-value, inx; iny), i.e. registering current signals detected respectively by the X-axis accelerometer 211 and the Y-axis accelerometer as their initial signals.

(d1) detecting whether the inclination of the micro inertial sensing module with respect to the X-axis and Y-axis is falling within a range of balance; that is, the range of balance is previously defined as 0 g±0.3 g, wherein $g=9.8\ m/s^2$ and configured in the micro inertial sensing module 20, and thus when the inclination signals (Tvs, Tvy) fall inside the range of balance, the micro inertial sensing module 20 is evaluated as being situated in a balance status so as to prevent an unwanted page change to be performed by unintended hand shivering; otherwise, the micro inertial sensing module 20 is evaluated as being situated in an unbalance status and thus the flow proceeds back to the previous mode detecting step (c). It is noted that the range of balance is not limited by the aforesaid range, but can be defined at will with respect to user's preference.

(d2) evaluating whether an instant variation of the raw X-axis inclination signal is exceeding a threshold range when the micro inertial sensing module 20 is situated in the balance status; that is, when an instant variation of the raw X-axis inclination signal is exceeding the threshold range a page-changing step (d21) is enabled for enabling the micro processing unit 32 to transmit signal to the cursor control circuit 33, where it is used for control a page-change displayed on the display 40; otherwise, the process flow back to the foregoing mode detecting step (c).

(d3) evaluating whether the instant variation of the raw X-axis inclination signal is lastingly fixed to a detection of the micro inertial sensing module as it is tilt by a specific inclination angle; if so, the continuous page-changing step (d4) is performed. The reasoning of the continuous page-changing step is that: by the steps (d1), (d2) and (d21), one hand movement can only turn one page that can be very inconvenient and time-consuming when there are many pages waiting to be turned. Hence, the continuous page-changing step (d4) enables the micro processing unit 32 to perform page changing continuously simply by a big swing of hand and then hold still at a specific inclination angle without moving, that can turn multiple pages by a simple movement. It is noted that the continuous page-changing is stopped and the process proceeds back to the mode detecting step as soon as the raw inclination signal is not lastingly fixed to a detection of the micro inertial sensing module as it is tilt by a specific inclination angle.

(e1) registering the X-axis vibration signal as an middle value of the difference of the X-axis raw inclination signal and the stabilized X-axis inclination signal, i.e. calculating an X-axis vibration according to the formula: $Difx=(Tx-Avx)/2$;

registering the Y-axis vibration signal as an middle value of the difference of the Y-axis raw inclination signal and the stabilized Y-axis inclination signal, i.e. calculating a Y-axis vibration according to the formula: $Dify=(Tvy-Avy)/2$;

acquiring a compensated X-axis inclination signal by subtracting the X-axis vibration signal from the X-axis raw inclination signal, i.e. calculating a modified X-axis raw inclination signal according to the formula: $Tvx'=Tvx-Difx$; and acquiring a compensated Y-axis inclination signal by subtracting the Y-axis vibration signal from the Y-axis raw inclination signal, i.e. calculating a modified Y-axis raw inclination signal according to the formula: $Tvy'=Tvy-Dify$.

(e2) registering an X-axis variation as the subtraction of the initial signal of the X-axis accelerometer from the modified X-axis raw inclination signal; and registering a Y-axis variation as the subtraction of the initial signal detected by the Y-axis accelerometer from the modified Y-axis raw inclination signal, i.e. $Dx=(Tvx'-inx)$, $Dy=(Tvy'-iny)$. Please refer to FIG. 6(a), FIG. 6(b), FIG. 7(a) and FIG. 7(b), in which FIG. 6(a) and FIG. 7(a) respectively shows accelerations detected by the X-axis accelerometer and Y-axis accelerometer, both without vibration modification, and FIG. 6(b) and FIG. 7(b) respectively shows accelerations detected by the X-axis accelerometer and Y-axis accelerometer, both with vibration modification. As seen in the figures, after being compensated, a acceleration profile with gentle undulation can be achieved so that a more accurate cursor positioning can be achieved.

(e3) mapping the differences (Dx, Dy) as a coordinate signal for controlling the movement of the cursor 41 displayed on the display 40 while outputting the coordinate signal to the cursor control circuit 33 for controlling the same.

Figure 8:
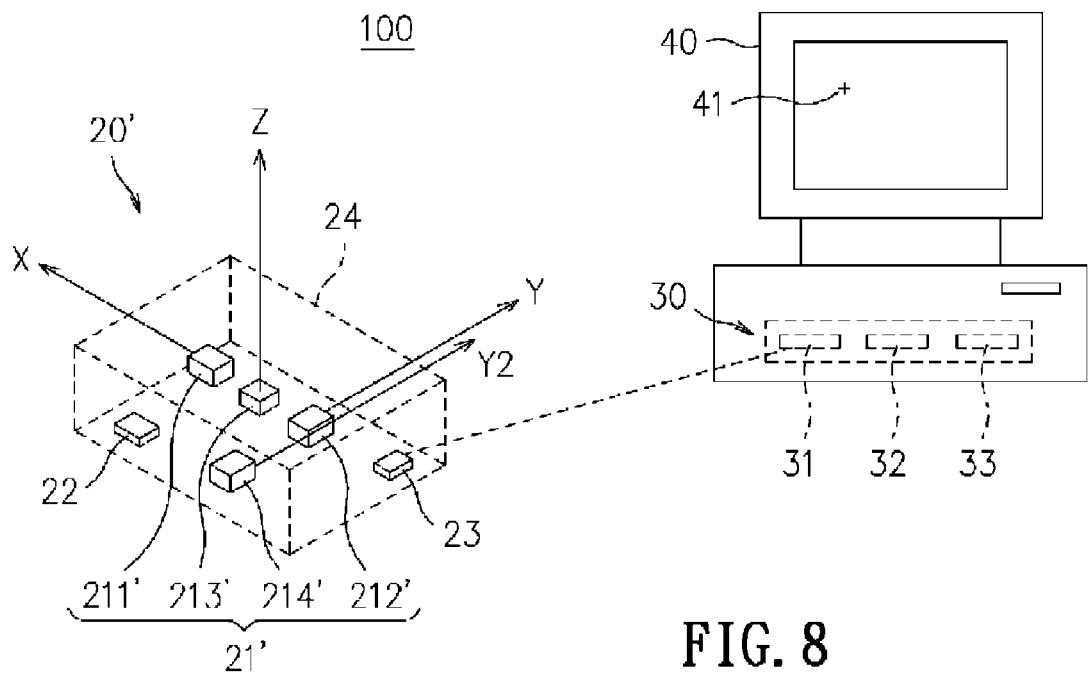
FIG. 8 is a schematic diagram illustrating an inertial sensing apparatus according to a second preferred embodiment of the invention.
Figure 9:
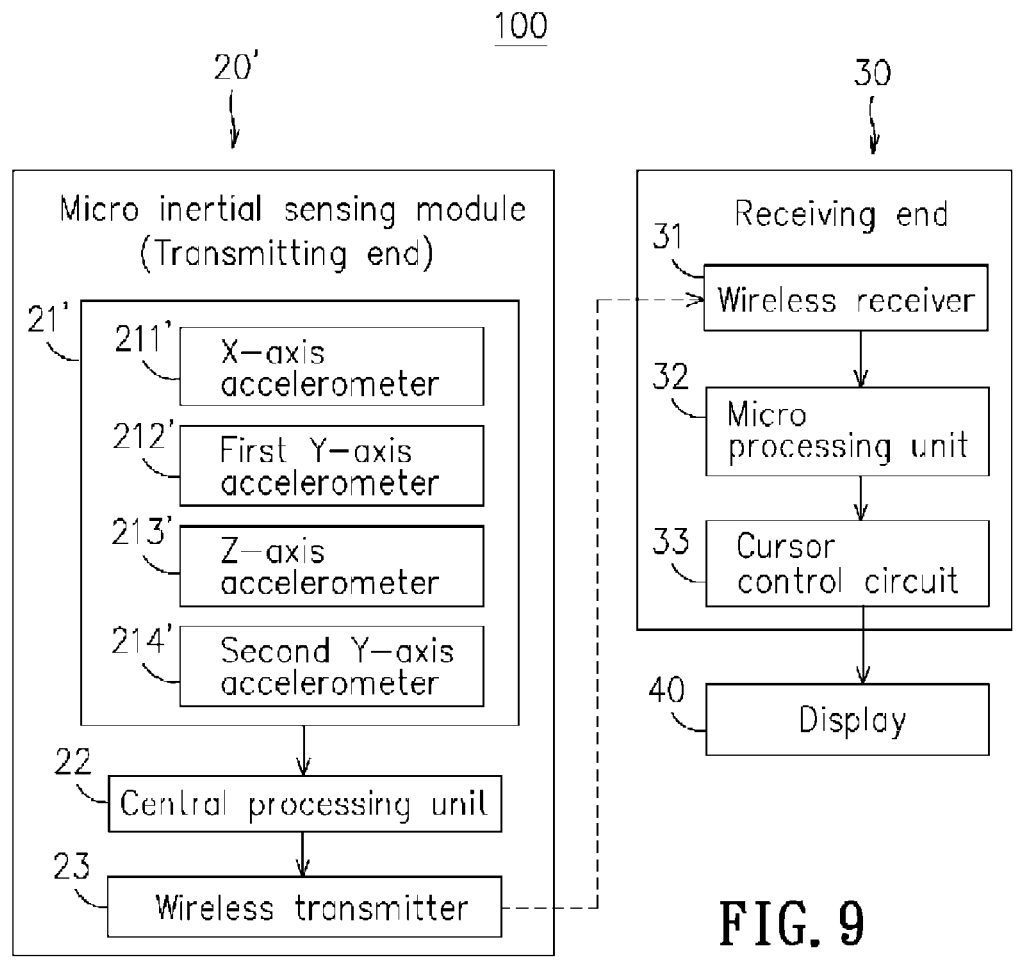
FIG. 9 is a function block diagram of FIG. 8.

Please refer to FIG. 8 and FIG. 9, which are respectively a schematic diagram illustrating an inertial sensing apparatus according to a second preferred embodiment of the invention and a function block diagram thereof. As seen in the figures, the three-dimensional inertial sensing apparatus 100, similar to the three-dimensional inertial sensing apparatus 10 of the first embodiment, is primarily comprised of: a transmitting end, being substantially a micro inertial sensing module 20'; and a receiving end 30. In a preferred aspect, the micro inertial sensing module 20' is further comprised of: an micro inertial sensor 21', having an X-axis accelerometer 211' for measuring acceleration variations of gravity caused by a rolling movement of the micro inertial sensing module 20' with respect to an X axis of a Cartesian coordinate system of X-, Y-, and Z-axes defining the micro inertial sensing module, and a Y-axis accelerometer 212' for measuring acceleration variations of gravity caused by a pitch movement of the micro inertial sensing module 20' with respect to a Y axis of the Cartesian coordinate system; a z-axis accelerometer 213', for detecting an acceleration of gravity with respect to the Z-axis of the Cartesian coordinate system, caused by the rolling and pitching of the micro inertial sensing module 20' detected respectively by the X-axis accelerometer 211' and Y-axis accelerometer 212, so as to obtain information relating to the positioning of the micro inertial sensing module 20'; a second Y-axis accelerometer 214' for measuring another acceleration variations of gravity caused by the pitch movement of the micro inertial sensing module 20' with respect to a Y axis; a central processing unit 22, for receiving and processing signals from the micro inertial sensor 21' so as to generate a raw inclination signal accordingly; and a wireless transmitter 23, for transmitting the inclination signal received from the central processing unit 22; and a wireless transmitter 23, for transmitting the inclination signal received from the central processing unit 22. It is noted that when the micro inertial sensing module 20' is positioned upside down, that is, belly up, the detection of the Z-axis accelerometer 213' will activated the micro inertial sensing module 20' to operate in a reverse manner relating to cursor control and page-change control.

Similarly, the micro inertial sensor 21', the central processing unit 22 and the wireless transmitter 23 are all being received in a housing 24 while all being electrically networked to each other by a circuit which is further electrically connected to a control button disposed outside the housing 24. By disposing the control button outside the housing 24, a user holding the three-dimensional inertial sensing apparatus 100 is capable of initiating a signal transmission simply by the pressing of the control button.

Figure 10:
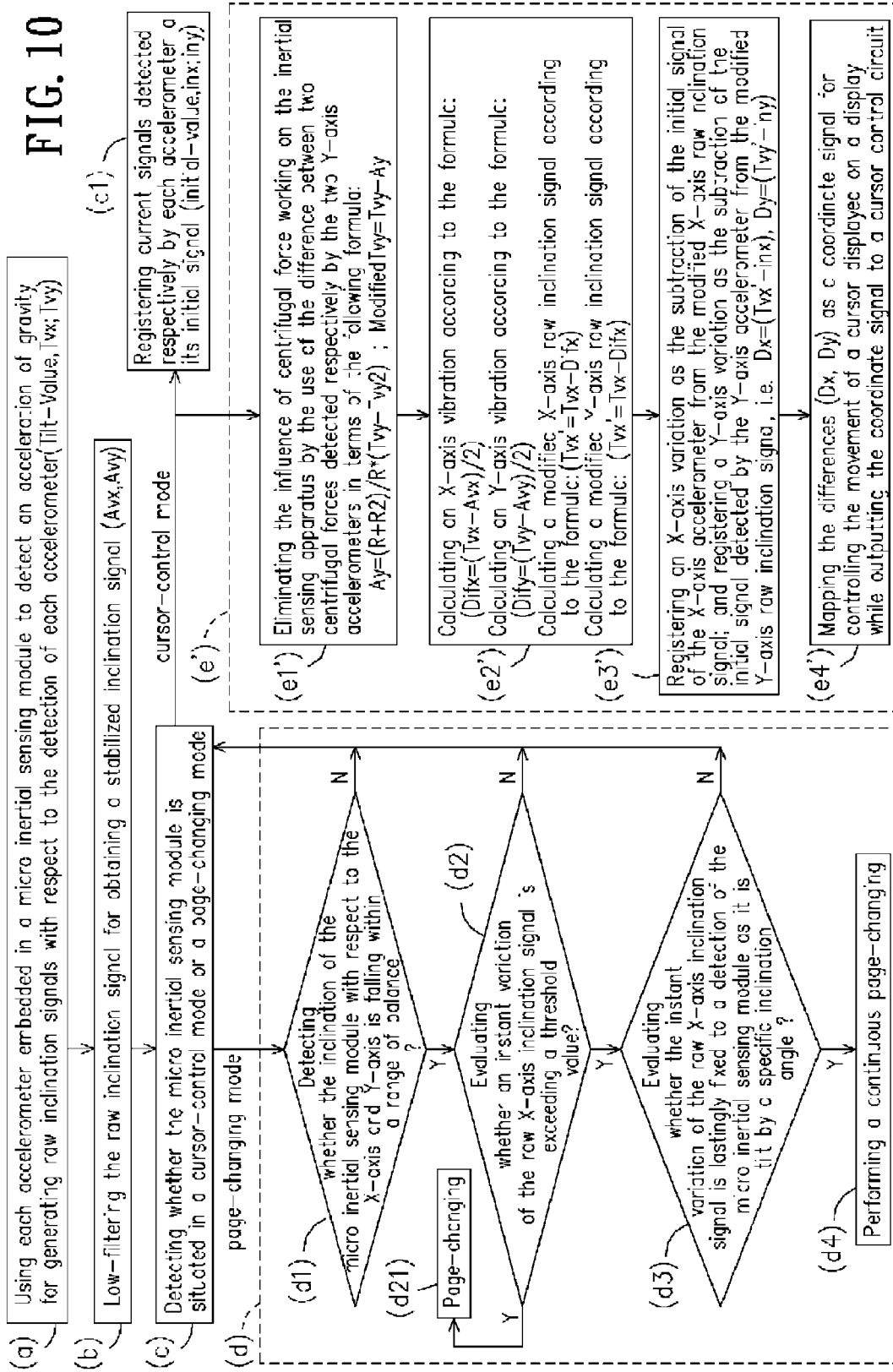
FIG. 10 is a flow chart depicting operation steps of the inertial sensing apparatus of the second preferred embodiment of the invention.

Please refer to FIG. 10, which is a flow chart depicting operation steps of the inertial sensing apparatus of the second preferred embodiment of the invention. The flow of the operation steps of the inertial sensing apparatus is illustrated in FIG. 10 and the detailed description of each step is depicted in the following:

(a) using each accelerometer embedded in the micro inertial sensing module 20' to detect an acceleration of gravity for generating raw inclination signals (Tilt-Value) with respect to the detection of each accelerometer; i.e. using the X-axis accelerometer 211' and the Y-axis accelerometer 212', the Z-axis accelerometer 213' and the second Y-axis accelerometer 214' to detect rolling and pitching of the micro inertial sensing module 20' and thus generate an X-axis raw inclination signal Tvx, a Y-axis raw inclination signal Tvy, a Z-axis raw inclination signal Tvz and a second Y-axis raw inclination signal Tvy2.

(b) low-filtering the X-axis raw inclination signal Tvx, the Y-axis raw inclination signal Tvy and the Z-axis raw inclination signal Tvz for obtaining three stabilized inclination signals Avx, Avy and Avz, during which the second Y-axis raw inclination signal Tvy2 is ignored.

(c) detecting whether the micro inertial sensing module 20 is situated in a cursor-control mode e or a page-changing mode d.

(c1) registering current signals detected respectively by each accelerometer a its initial signal (initial-value, inx; iny).

(d1) detecting whether the inclination of the micro inertial sensing module with respect to the X-axis and Y-axis is falling within a range of balance.

(d2) evaluating whether an instant variation of the raw X-axis inclination signal is exceeding a threshold range when the micro inertial sensing module 20 is situated in the balance status.

(d3) evaluating whether the instant variation of the raw X-axis inclination signal is lastingly fixed to a detection of the micro inertial sensing module as it is tilt by a specific inclination angle; it is noted that the steps (d1), (d2) and (d3) is similar to those of FIG. 5 and thus not described further herein.

(e1') eliminating the influence of centrifugal force working on the inertial sensing apparatus by the use of the difference between two centrifugal forces detected respectively by the two Y-axis accelerometers in terms of the following formula:

$$Ay = (R+R2)/R \times (Tvy - Tvy2)$$

$$\text{Modified} Tvy = Tvy - Ay$$

it is known that a swing of a user' arm can be represented as a circular movement and the centrifugal force resulting from the circular movement is going to cause gravity variation that will adversely affect the detection of the micro inertial sensing module 20', especially for the accelerometers arranged on the Y axis of the sensing module 20'. Therefore, it is intended to rectify such error using the acceleration difference between the Y-axis accelerometer 212' and the second Y-axis accelerometer 214'. As seen in FIG. 11, the Y-axis accelerometer 212' is arranged at a position closer to the display 40 than that of the second Y-axis accelerometer 214', i.e. the second Y-axis accelerometer 214' is positioned at a distance R2 from the rotation center C while the Y-axis accelerometer 212' is positioned at a position at a distance R2 behind the second Y-axis accelerometer 214', so that the centrifugal force can be calculated by the following formula:

$$Tvy = Ay + G \sin\theta = (R+R2) = \omega^2 + G \sin\theta = R \times \omega^2 + R2 \times \omega^2 + G \sin\theta$$

$$Tvy2 = Ay2 + G \sin\theta = R2 \times \omega^2 + G \sin\theta$$

$$Tvy - Tvy2 = R \times \omega^2$$

$$\omega 2 = Tvy - Tvy2/R$$

wherein Tvy is the inclination signal of the Y-axis accelerometer;

Tvy2 is the inclination signal of the second Y-axis accelerometer;

Ay is the centrifugal force detected by the Y-axis accelerometer;

Ay2 is the centrifugal force detected by the second Y-axis accelerometer;

G is gravity

θ is the included angle formed between axis of the two coaxial Y-axis accelerometers and a level surface;

ω is angular speed;

R is the distance spaced between the Y-axis and the second Y-axis accelerometer;

R2 is the distance between the second Y-axis accelerometer and a center of rotation.

Please refer to FIG. 12(a), FIG. 12(b), FIG. 13(a) and FIG. 13(b), in which FIG. 12(a) and FIG. 13(a) respectively are profiles showing the detection of the Y-axis accelerometer as the Y-axis accelerometer is being influenced by a centrifugal force and by centrifugal forces as the Y-axis accelerometer is moving circularly, and FIG. 12(b) and FIG. 13(b) respectively shows profiles of modified acceleration. As seen in the figures, after being modified, acceleration profiles with gentle undulation can be achieved so that the adverse affection of the centrifugal force to the Y-axis can be reduced.

(e2') registering the X-axis vibration signal as an middle value of the difference of the X-axis raw inclination signal and the stabilized X-axis inclination signal, i.e. calculating an X-axis vibration according to the formula: Difx=(Tvx−Avx/2;

registering the Y-axis vibration signal as an middle value of the difference of the Y-axis raw inclination signal and the stabilized Y-axis inclination signal, i.e. calculating a Y-axis vibration according to the formula: Dify=(Tvy−Avy)/2;

acquiring a compensated X-axis inclination signal by subtracting the X-axis vibration signal from the X-axis raw inclination signal, i.e. calculating a modified X-axis raw inclination signal according to the formula: Tvx'=Tvx−Difx; and (e3') acquiring a compensated Y-axis inclination signal by subtracting the Y-axis vibration signal from the Y-axis raw inclination signal, i.e. calculating a modified Y-axis raw inclination signal according to the formula: Tvy'=Tvy−Dify.

(e4') registering an X-axis variation as the subtraction of the initial signal of the X-axis accelerometer from the modified X-axis raw inclination signal; and registering a Y-axis variation as the subtraction of the initial signal detected by the Y-axis accelerometer from the modified Y-axis raw inclination signal, i.e. Dx=(Tvx'−inx), Dy=(Tvy'−iny)

(e5') mapping the differences (Dx, Dy) as a coordinate signal for controlling the movement of the cursor 41 displayed on the display 40 while outputting the coordinate signal to the cursor control circuit 33 for controlling the same. Iit is noted that the steps (e2')~(e4') is similar to the step (e1)~(e3) of FIG. 5 and thus not described further herein.

From the above description, it is noted that the method and apparatus of the invention have the following characteristics:

(1) By the step of mode detection as the step (c) of FIG. 5 and the step (c) in FIG. 10, the three-dimensional inertial sensing apparatus of the invention is able to switch between a page-changing mode and a cursor-control mode so as to correspondingly select a process to be perform from the group consisting a cursor-control process and a page-change process.

(2) By the step (d21) of FIG. 5 and the step (d21) of FIG. 10, multiple pages can be turned by a swing of the hand holding the three-dimensional inertial sensing apparatus; and by the step (d4) of FIG. 5 and the step (d4) of FIG. 10, a swing of the hand can be control to turn only one page.

(3) Signal vibration can be modified by the step (e1) of FIG. 5 and the step (e2') of FIG. 10.

(4) By the disposition of the Z-axis accelerometer, when the micro inertial sensing module 20' is positioned upside down, that is, belly up, the detection of the Z-axis accelerometer 213' will activated the micro inertial sensing module 20' to operate in a reverse manner relating to cursor control and page-change control.

(5) By using the difference between the two centrifugal forces detected respectively by two Y-axis accelerometers, coaxially arranged on a Y axis of a Cartesian coordinate system of X-, Y-, and Z-axes defining the inertial sensing apparatus, the influence of centrifugal force working upon the inertial sensing apparatus can be reduced.

(6) The control accuracy of the three-dimensional inertial sensing apparatus and method is high since the accumulated integration error common to those conventional accelerometer apparatus and method is avoided (7) The three-dimensional inertial sensing apparatus of the invention is ease to operate.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A three-dimensional inertial sensing method for cursor control, comprising the steps of:
    using a micro inertial sensing module to detect an acceleration of gravity for generating a raw inclination signal accordingly;
    low-filtering the raw inclination signal for obtaining a stabilized inclination signal;
    registering an initial signal of the micro inertial sensing module;
    calculating a signal variation amount basing on the raw inclination signal, the stabilized inclination signal so as to compensate the raw inclination signal using the signal variation amount;
    calculating the difference between the compensated inclination signal and the initial signal; and
    mapping the differences as a coordinate signal for controlling the movement of a cursor displayed on a display.

2. The method of claim 1, wherein the micro inertial sensing module is comprised of:
    an X-axis accelerometer, for measuring acceleration variations of gravity caused by a rolling movement of the micro inertial sensing module with respect to an X axis of a Cartesian coordinate system of X-, Y-, and Z-axes defining the micro inertial sensing module; and
    a Y-axis accelerometer, for measuring acceleration variations of gravity caused by a pitch movement of the micro inertial sensing module with respect to a Y axis of the Cartesian coordinate system.

3. The method of claim 2, wherein the micro inertial sensing module further comprises a Z-axis accelerometer, used for detecting an acceleration of gravity with respect to the Z-axis of the Cartesian coordinate system, caused by the rolling and pitching of the micro inertial sensing module detected respectively by the X-axis accelerometer and Y-axis accelerometer, so as to obtain information relating to the positioning of the micro inertial sensing module.

4. The method of claim 2, wherein the micro inertial sensing module further comprises a second Y-axis accelerometer, spaced from the Y-axis accelerometer by a specific distance.

5. The method of claim 4, wherein the influence of centrifugal force working on the inertial sensing apparatus can be eliminated by the use of the difference between two centrifugal forces detected respectively by the two Y-axis accelerometers in terms of the following formula:

$$Ay=(R+R2)/R\times(Tvy-Tvy2)$$

$$\text{Modified}Tvy=Tvy-Ay$$

wherein Ay is the centrifugal force detected by the Y-axis accelerometer;

R is the distance spaced between the Y-axis and the second Y-axis accelerometer;

R2 is the distance between the second Y-axis accelerometer and a center of rotation;

Tvy is the inclination signal of the Y-axis accelerometer;

Tvy2 is the inclination signal of the second Y-axis accelerometer;

i.e. a modified Y-axis inclination signal can be obtained by subtracting the centrifugal force Ay from the raw Y-axis inclination signal Tvy.

6. The method of claim 1, wherein the calculating of the signal variation amount basing on the raw inclination signal, the stabilized inclination signal for compensating the raw inclination signal using the signal variation amount further comprises the steps of:
    modifying the raw inclination signal detected by the X-axis accelerometer by subtracting an X-axis vibration signal detected by the X-axis accelerometer from the raw inclination signal detected by the X-axis accelerometer;
    modifying the raw inclination signal detected by the Y-axis accelerometer by subtracting an Y-axis vibration signal detected by the Y-axis accelerometer from the raw inclination signal detected by the Y-axis accelerometer;
    registering an X-axis variation as the subtraction of the initial signal detected by the X-axis accelerometer from the modified X-axis raw inclination signal; and
    registering a Y-axis variation as the subtraction of the initial signal detected by the Y-axis accelerometer from the modified Y-axis raw inclination signal.

7. The method of claim 6, wherein the modifying of the raw inclination signals detected by the X-axis and Y-axis accelerometers further comprises the steps of:
    registering the X-axis vibration signal as an middle value of the difference of the X-axis raw inclination signal and the stabilized X-axis inclination signal;
    registering the Y-axis vibration signal as an middle value of the difference of the Y-axis raw inclination signal and the stabilized Y-axis inclination signal;
    acquiring a compensated X-axis inclination signal by subtracting the X-axis vibration signal from the X-axis raw inclination signal; and
    acquiring a compensated Y-axis inclination signal by subtracting the Y-axis vibration signal from the Y-axis raw inclination signal.

8. The method of claim 1, wherein the micro inertial sensing module is coupled to a central processing unit, capable of receiving the measurements of acceleration variations and thus generating raw inclination signals accordingly; and the central processing unit is connected to a wireless transmitter for transmitting the raw inclination signals; and the wireless transmitter is enabled to function corresponding to a wireless receiver in a manner that the wireless receiver is able to receive the raw inclination signals transmitted by the wireless transmitter and thus send the received raw inclination signals to a micro processing unit to be low-pass filtered and processed by other posterior procedures; and the micro processing unit is connected to a display by way of a cursor control circuit, capable of controlling the movement of a cursor displayed on the display as well as controlling a page-changing or continuous page-changing on the display.

9. A three-dimensional inertial sensing method for directing page-changing, comprising the steps of:
    using a micro inertial sensing module to detect an acceleration of gravity for generating a raw inclination signal accordingly;
    low-filtering the raw inclination signal for obtaining a stabilized inclination signal;

detecting whether the raw inclination signal of the micro inertial sensing module with respect to the X-axis and Y-axis is falling within a range of balance; if so, continue the detecting; otherwise, steps posterior to the detection is perform; and evaluating whether an instant variation of the raw X-axis inclination signal exceeds a threshold range, enabling a page-changing if the raw X-axis inclination signal exceeds the threshold range, otherwise, continuing detecting whether the raw inclination signal of the micro inertial sensing module with respect to the X-axis and Y-axis is falling within the range of balance.

10. The method of claim 9, wherein a continuous page-changing is perform while the instant variation of the raw inclination signal is exceeding a threshold range and the raw inclination signal is not transient but lastingly fixed to a detection of the micro inertial sensing module as it is tilt by a specific inclination angle.

11. The method of claim 10, wherein the continuous page-changing is stopped and the process proceeds back to the mode detecting step as soon as the raw inclination signal is not lastingly fixed to a detection of the micro inertial sensing module as it is tilt by a specific inclination angle.

12. The method of claim 9, wherein the micro inertial sensing module is comprised of: at least an X-axis accelerometer, for measuring acceleration variations of gravity caused by a rolling movement of the micro inertial sensing module with respect to an X axis of a Cartesian coordinate system of X-, Y-, and Z-axes defining the micro inertial sensing module.

13. The method of claim 9, wherein the micro inertial sensing module is coupled to a central processing unit, capable of receiving the measurements of acceleration variations and thus generating raw inclination signals accordingly; and the central processing unit is connected to a wireless transmitter for transmitting the raw inclination signals; and the wireless transmitter is enabled to function corresponding to a wireless receiver in a manner that the wireless receiver is able to receive the raw inclination signals transmitted by the wireless transmitter and thus send the received raw inclination signals to a micro processing unit to be low-pass filtered and processed by other posterior procedures; and the micro processing unit is connected to a display by way of a cursor control circuit, capable of controlling the movement of a cursor displayed on the display as well as controlling a page-changing or continuous page-changing on the display.

14. The method of claim 13, wherein the range of balance is defined in the micro processing unit so as to be used for evaluating whether the raw inclination signal is falling inside the range of balance; if so, the micro inertial sensing module is situated in a balance status; otherwise, the micro inertial sensing module is situated in an unbalance status.

15. The method of claim 14, wherein the range of balance is defined as 0 g±0.3 g, and g=9.8 $m/s^2$.

16. A three-dimensional inertial sensing method, comprising the steps of:
using a micro inertial sensing module to detect an acceleration of gravity for generating a raw inclination signal accordingly;
low-filtering the raw inclination signal for obtaining a stabilized inclination signal;
detecting whether the micro inertial sensing module is situated in a cursor-control mode or a page-changing mode so as to correspondingly select a process to be perform from the group consisting a cursor-control process and a page-change process;

detecting whether the inclination of the micro inertial sensing module with respect to the X-axis and Y-axis is falling within a range of balance; if so, continue the detecting; otherwise, steps posterior to the detection is perform; and evaluating whether an instant variation of the raw X-axis inclination signal is exceeding a threshold range; if so, a page-changing is enabled; otherwise, the process flow back to the foregoing mode detecting step.

17. The method of claim 16, wherein the cursor-control process comprises the steps of:
registering an initial signal of the micro inertial sensing module;
calculating a signal variation amount basing on the raw inclination signal, the stabilized inclination signal so as to compensate the raw inclination signal using the signal variation amount;
calculating the difference between the compensated inclination signal and the initial signal; and
mapping the differences as a coordinate signal for controlling the movement of a cursor displayed on a display.

18. The method of claim 17, wherein the calculating of the signal variation amount basing on the raw inclination signal, the stabilized inclination signal for compensating the raw inclination signal using the signal variation amount further comprises the steps of:
modifying the raw inclination signal detected by the X-axis accelerometer by subtracting an X-axis vibration signal detected by the X-axis accelerometer from the raw inclination signal detected by the X-axis accelerometer;
modifying the raw inclination signal detected by the Y-axis accelerometer by subtracting an Y-axis vibration signal detected by the Y-axis accelerometer from the raw inclination signal detected by the Y-axis accelerometer;
registering an X-axis variation as the subtraction of the initial signal detected by the X-axis accelerometer from the modified X-axis raw inclination signal; and
registering a Y-axis variation as the subtraction of the initial signal detected by the Y-axis accelerometer from the modified Y-axis raw inclination signal.

19. The method of claim 18, wherein the modifying of the raw inclination signals detected by the X-axis and Y-axis accelerometers further comprises the steps of:
registering the X-axis vibration signal as an middle value of the difference of the X-axis raw inclination signal and the stabilized X-axis inclination signal;
registering the Y-axis vibration signal as an middle value of the difference of the Y-axis raw inclination signal and the stabilized Y-axis inclination signal;
acquiring a compensated X-axis inclination signal by subtracting the X-axis vibration signal from the X-axis raw inclination signal; and
acquiring a compensated Y-axis inclination signal by subtracting the Y-axis vibration signal from the Y-axis raw inclination signal.

20. The method of claim 16, wherein the micro inertial sensing module is comprised of:
an X-axis accelerometer, for measuring acceleration variations of gravity caused by a rolling movement of the micro inertial sensing module with respect to an X axis of a Cartesian coordinate system of X-, Y-, and Z-axes defining the micro inertial sensing module; and
a Y-axis accelerometer, for measuring acceleration variations of gravity caused by a pitch movement of the micro inertial sensing module with respect to a Y axis of the Cartesian coordinate system.

21. The method of claim 20, wherein the micro inertial sensing module further comprises a Z-axis accelerometer, used for detecting an acceleration of gravity with respect to the Z-axis of the Cartesian coordinate system, caused by the rolling and pitching of the micro inertial sensing module detected respectively by the X-axis accelerometer and Y-axis accelerometer, so as to obtain information relating to the positioning of the micro inertial sensing module.

22. The method of claim 20, wherein the micro inertial sensing module further comprises a second Y-axis accelerometer, spaced from the Y-axis accelerometer by a specific distance.

23. The method of claim 22, wherein the influence of centrifugal force working on the inertial sensing apparatus can be eliminated by the use of the difference between two centrifugal forces detected respectively by the two Y-axis accelerometers in terms of the following formula:

$$Ay=(R+R2)/R \times (Tvy-Tvy2)$$

$$\text{Modified} Tvy = Tvy - Ay$$

wherein Ay is the centrifugal force detected by the Y-axis accelerometer;
R is the distance spaced between the Y-axis and the second Y-axis accelerometer;
R2 is the distance between the second Y-axis accelerometer and a center of rotation;
Tvy is the inclination signal of the Y-axis accelerometer;
Tvy2 is the inclination signal of the second Y-axis accelerometer;
a modified Y-axis inclination signal can be obtained by subtracting the centrifugal force Ay from the raw Y-axis inclination signal Tvy.

24. The method of claim 16, wherein the range of balance is defined as 0 g±0.3 g, and g=9.8 $m/s_2$.

25. The method of claim 24, wherein the micro inertial sensing module is coupled to a central processing unit, capable of receiving the measurements of acceleration variations and thus generating raw inclination signals accordingly; and the central processing unit is connected to a wireless transmitter for transmitting the raw inclination signals; and the wireless transmitter is enabled to function corresponding to a wireless receiver in a manner that the wireless receiver is able to receive the raw inclination signals transmitted by the wireless transmitter and thus send the received raw inclination signals to a micro processing unit to be low-pass filtered and processed by other posterior procedures; and the micro processing unit is connected to a display by way of a cursor control circuit, capable of controlling the movement of a cursor displayed on the display as well as controlling a page-changing or continuous page-changing on the display.

26. The method of claim 16, wherein a continuous page-changing is perform while the instant variation of the raw inclination signal is exceeding a threshold range and the raw inclination signal is not transient but lastingly fixed to a detection of the micro inertial sensing module as it is tilt by a specific inclination angle.

27. The method of claim 26, wherein the continuous page-changing is stopped and the process proceeds back to the mode detecting step as soon as the raw inclination signal is not lastingly fixed to a detection of the micro inertial sensing module as it is tilt by a specific inclination angle.

28. The method of claim 16, wherein the micro inertial sensing module is comprised of: at least an X-axis accelerometer, for measuring acceleration variations of gravity caused by a rolling movement of the micro inertial sensing module with respect to an X axis of a Cartesian coordinate system of X-, Y-, and Z-axes defining the micro inertial sensing module.

29. A three-dimensional inertial sensing apparatus, comprising:
a micro inertial sensing module, for detecting an acceleration of gravity for generating a raw inclination signal accordingly, further comprising:
an X-axis accelerometer, for measuring acceleration variations of gravity caused by a rolling movement of the micro inertial sensing module with respect to an X axis of a Cartesian coordinate system of X-, Y-, and Z-axes defining the micro inertial sensing module;
a first Y-axis accelerometer, for measuring a first acceleration variation of gravity caused by a pitch movement of the micro inertial sensing module with respect to a Y axis of the Cartesian coordinate system; and
a second Y-axis accelerometer, for measuring a second acceleration variation of gravity caused by a pitch movement of the micro inertial sensing module with respect to a Y axis of the Cartesian coordinate system, wherein the influence of centrifugal force working on the inertial sensing apparatus can be eliminated by the use of the difference between two centrifugal forces detected respectively by the two Y-axis accelerometers; and
a receiving end, for receiving the raw inclination signal of the micro inertial sensing module;
wherein the micro inertial sensing module is coupled to a central processing unit, capable of receiving the measurements of acceleration variations and thus generating raw inclination signals accordingly; and the central processing unit is connected to a wireless transmitter for transmitting the raw inclination signals; and the wireless transmitter is enabled to function corresponding to a wireless receiver in a manner that the wireless receiver is able to receive the raw inclination signals transmitted by the wireless transmitter and thus send the received raw inclination signals to a micro processing unit to be low-pass filtered and processed by other posterior procedures; and the micro processing unit is connected to a display by way of a cursor control circuit, capable of controlling the movement of a cursor displayed on the display as well as controlling a page-changing or continuous page-changing on the display.

30. The apparatus of claim 29, wherein the micro inertial sensing module further comprises a Z-axis accelerometer, used for detecting an acceleration of gravity with respect to the Z-axis of the Cartesian coordinate system, caused by the rolling and pitching of the micro inertial sensing module detected respectively by the X-axis accelerometer and Y-axis accelerometer, so as to obtain information relating to the positioning of the micro inertial sensing module.

* * * * *